June 23, 1959 — A. GOLOFF ET AL — 2,891,394
FLEXIBLE AND VIBRATION DAMPING COUPLING
Filed April 17, 1957
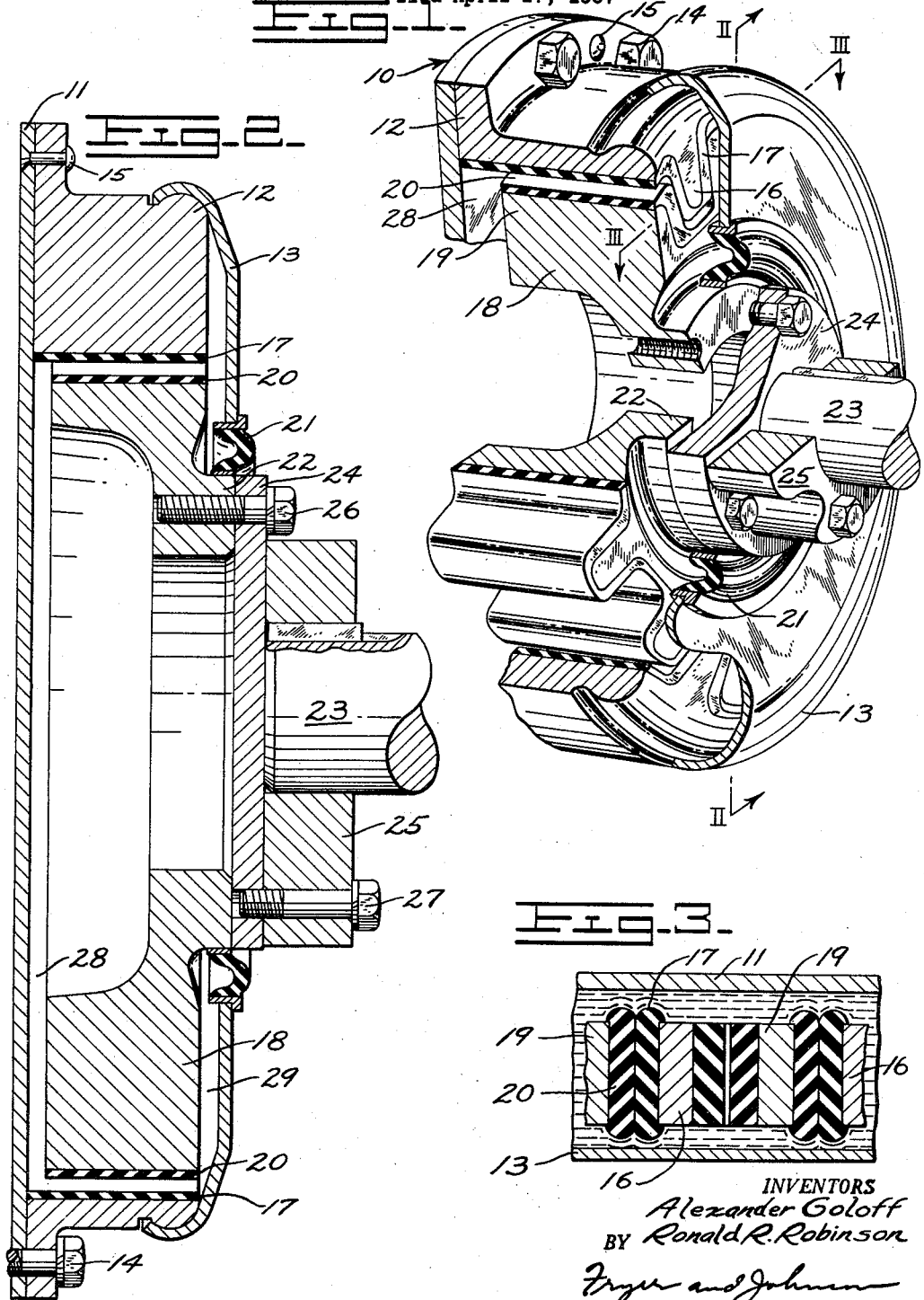
INVENTORS
Alexander Goloff
BY Ronald R. Robinson
ATTORNEYS United States Patent Office 2,891,394
Patented June 23, 1959

2,891,394

FLEXIBLE AND VIBRATION DAMPING COUPLING

Alexander Goloff, Washington, and Ronald R. Robinson, Morton, Ill., assignors to Caterpillar Tractor Co., Peoria, Ill., a corporation of California Application April 17, 1957, Serial No. 653,415

6 Claims. (Cl. 64—14)

This invention relates to a flexible coupling for use between driving and driven members, and relates particularly to flexible couplings having vibration damping characteristics.

Crankshafts of internal combustion engines are known to vibrate torsionally because of the forces to which they are subjected during engine operation. A portion of this vibration is transmitted through the engine flywheel, and when the engine is coupled to equipment such as a generator or marine gear, the driven equipment and the coupling are subjected to excessive torsional vibration. Unless such vibration is damped, it may become so acute as to cause breakage of the coupling or the driven equipment.

Some currently available couplings may be tuned to operate at a predetermined speed and load. However, they are quite sensitive to the mass-elastic system, and if either the operating speed or the mass of the driven member is changed, then another coupling must be designed to accommodate the changes. Likewise, the driving engine and the driven equipment are frequently operated in a state of angular or radial misalignment. In presently available couplings, the inability to flex usually gives rise to undesirable stresses within the coupling, the shafts of the engine, and the driven member, with a resultant high rate of wear or failure of parts. Also, in present gear-type couplings it is necessary to accurately machine the teeth of the gears in order to obtain a perfect mesh.

It is an object of this invention to provide a flexible coupling with damping characteristics.

Another object is to provide a damped and flexible coupling which is insensitive to the mass-elastic system.

Another object is to provide a flexible coupling which will permit angular misalignment between the driving and the driven members.

Another object is to provide a damped and flexible coupling which will permit radial misalignment between the driving member and the driven member.

It is a still further object to provide a gear-type coupling in which the teeth are not machined.

In the drawings:

Fig. 1 is an isometric view, with parts broken away, of a coupling embodying the present invention;

Fig. 2 is a view in central section along line II—II of Fig. 1; and

Fig. 3 is a view in section along line III—III of Fig. 1.

In the drawings, a driving member, generally indicated at 10, comprises a driving plate 11, a driving ring 12 and an annular housing 13. The driving plate 11 is adapted to be secured to an engine flywheel (not shown) as by cap screws 14. The driving ring 12 is secured to the driving plate by means of rivets 15. The driving ring is provided with spaced internal teeth 16, the working faces of which are covered with a resilient material 17 of a selected hardness. A hub, or driven member 18, is positioned in spaced relationship to the driving plate 11. The driven member 18 is provided with spaced external teeth 19 adapted to mesh with the teeth 16 of the driving ring 12. A resilient material 20 of a selected hardness is likewise provided to cover the working faces of the teeth 19. The annular housing 13 is carried by the driving ring 12 and is shaped to provide a space between itself and the ring. A diaphragm seal 21 is provided to seal the space between the bore of the housing and a hub portion 22 of the driven member. An output shaft 23 is secured to the driven member in the usual manner as by driven plate 24 and driven ring 25, each of which is secured as by cap screws 26 and 27, respectively.

As shown in Fig. 2, this coupling is dimensioned to provide a chamber 28 between the driving plate 11 and the driven member 18, and a similar chamber 29 is provided at the opposite end of the coupling by the housing 13. The chambers 28 and 29 are filled with a viscous material of selected viscosity, preferably a silicone compound.

In operation, the resilient material covering the working faces of the driving teeth 16 and the driven teeth 19 provides a resilient driving connection between an engine and a driven load. As torsional vibrations occur, as well as fluctuating variations in load, the resilient material covering the meshing teeth is elastically compressed and tends to be elastically displaced into the space beyond the axial limits of the teeth. Upon impact of the resiliently clad mating teeth, the resilient material is compressed and tends to displace the viscous material to produce a "pumping-type" damping action. Fig. 3 shows the elastic compression of the resilient material as well as the displacement of the viscous material. As the vibration of the engine and driven member increases, the resilient material is compressed to a greater extent and displaces the viscous material at a more rapid rate, thus increasing the amount of damping. Since this coupling is insensitive to the mass-elastic system, it is adaptable to a wide range of engine speeds.

The resilient material covering the teeth in combination with the use of the diaphragm seal 21 allows the driven equipment to operate in angular or radial misalignment with respect to the driving engine. Likewise, since the resilient material completely covers the working faces of the gear teeth, there is no metal-to-metal contact between them and the teeth need not be machined.

We claim:

1. A flexible coupling comprising a driving member, a driven member, mating teeth on both members, resilient compressible rubber-like material interposed between the cooperating faces of said teeth, and a housing containing a viscous material enclosing said mating teeth.

2. A flexible coupling comprising a driving member, a driven member, teeth on both the driving and the driven members in mating relationship with each other, resilient compressible rubber-like material covering the working faces of the teeth, and viscous material surrounding said teeth.

3. A flexible coupling having a driving ring, teeth on the driving ring, a housing, a driven member, teeth on the driven member to mesh with the teeth of the driving ring, resilient compressible rubber-like material interposed between the cooperating faces of said teeth, a chamber formed by the housing and enclosing said teeth, and damping compound retained within said chamber.

4. A flexible coupling for driving and driven members comprising a driving plate, a ring secured to the driving plate, an annular housing carried by the driving ring, a driven member, teeth on both the driving ring and the driven member in mating relationship with each other, resilient compressible rubber-like material interposed between the cooperating faces of the teeth of both the driving ring and the driven member, and a viscous substance surrounding said teeth.

5. A flexible coupling for driving and driven members comprising a driving plate, a ring secured to the driving plate, teeth on the inner diameter of the driving ring, a housing carried by the driving ring, a driven member, teeth on the outer periphery of the driven member in mating relationship with the teeth of the driving ring, resilient material interposed between the cooperating faces of the teeth of both the driving ring and the driven member, and viscous material in surrounding relationship to said teeth whereby displacement of the resilient material imparts a damping action to said coupling.

6. A flexible coupling having a driving plate, a driving ring secured to the driving plate, teeth on the inner diameter of the driving ring, a driven member axially spaced from the driving plate, teeth on the outer periphery of the driven member to mate with the teeth of the driving ring, resilient material interposed between the cooperating faces of the teeth of both the driving ring and the driven member, a housing forming a chamber, and damping compound retained within the chamber whereby displacement of the resilient material imparts a damping action to said flexible coupling.

References Cited in the file of this patent

UNITED STATES PATENTS

| | | |
|---|---|---|
| 1,375,688 | Friz | Apr. 26, 1921 |
| 1,435,141 | Serrell | Nov. 7, 1922 |
| 1,769,158 | Oechsle | July 1, 1930 |
| 2,838,955 | Burch | June 17, 1958 |

FOREIGN PATENTS

| | | |
|---|---|---|
| 650,746 | Great Britain | Feb. 28, 1951 |